(12) United States Patent
Ikai et al.

(10) Patent No.: US 11,811,286 B2
(45) Date of Patent: Nov. 7, 2023

(54) ELECTRIC COMPRESSOR

(71) Applicant: KABUSHIKI KAISHA TOYOTA JIDOSHOKKI, Kariya (JP)

(72) Inventors: Kensuke Ikai, Aichi-ken (JP); Taku Adaniya, Aichi-ken (JP); Shuji Takimoto, Aichi-ken (JP); Wataru Sugimoto, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 292 days.

(21) Appl. No.: 17/206,662

(22) Filed: Mar. 19, 2021

(65) Prior Publication Data
US 2021/0305873 A1   Sep. 30, 2021

(30) Foreign Application Priority Data
Mar. 31, 2020   (JP) .............................. JP2020-061979

(51) Int. Cl.
*H02K 3/52* (2006.01)
*H02K 5/20* (2006.01)
(Continued)

(52) U.S. Cl.
CPC .............. *H02K 3/522* (2013.01); *F25B 1/00* (2013.01); *F25B 31/004* (2013.01);
(Continued)

(58) Field of Classification Search
CPC ........ H02K 3/522; H02K 5/207; H02K 11/33; H02K 21/16; H02K 2203/06; H02K 3/28;
(Continued)

(56) References Cited

U.S. PATENT DOCUMENTS 6,544,009 B2    4/2003  Makino et al.
2012/0237372 A1 9/2012  Fukasaku et al.
(Continued)

FOREIGN PATENT DOCUMENTS

JP   2001-280249 A   10/2001
JP   2012-193638 A   10/2012
(Continued)

OTHER PUBLICATIONS

WO-2018078843-A1, machine translation (Year: 2023).*

*Primary Examiner* — Eric S Ruppert
*Assistant Examiner* — Kirstin U Oswald
(74) *Attorney, Agent, or Firm* — Sughrue Mion, PLLC

(57) ABSTRACT

An electric compressor includes a housing, an electric motor, and an inverter. The housing includes a motor chamber. The electric motor includes a stator that includes a stator core, a plurality of first coils, a plurality of second coils, and a plurality of third coils. The first coils are connected in series, the second coils are connected in series, and the third coils are connected in series. One of the first coils that is located electrically closest to the first phase is referred to as a first specific coil, one of the second coils that is located electrically closest to the second phase is referred to as a second specific coil, and one of the third coils that is located electrically closest to the third phase is referred to as a third specific coil. The first to third specific coils are disposed above the shaft center of the drive shaft.

3 Claims, 4 Drawing Sheets

(51) Int. Cl.
    *H02K 11/33*     (2016.01)
    *H02K 21/16*     (2006.01)
    *F25B 1/00*     (2006.01)
    *F25B 31/00*     (2006.01)

(52) U.S. Cl.
    CPC ........... *F25B 31/006* (2013.01); *H02K 5/207* (2021.01); *H02K 11/33* (2016.01); *H02K 21/16* (2013.01); *H02K 2203/06* (2013.01)

(58) Field of Classification Search
    CPC .. H02K 5/203; H02K 7/14; F25B 1/00; F25B 31/004; F25B 31/006; F04C 23/02; F04C 29/02; F04C 29/04
    See application file for complete search history.

(56) References Cited

U.S. PATENT DOCUMENTS

| | | | | |
|---|---|---|---|---|
| 2013/0004345 | A1* | 1/2013 | Horiba | H02K 5/225 |
| | | | | 417/411 |
| 2013/0078124 | A1* | 3/2013 | Fukasaku | H02K 5/225 |
| | | | | 417/410.1 |
| 2016/0013701 | A1* | 1/2016 | Suitou | H02K 5/24 |
| | | | | 310/43 |
| 2016/0294251 | A1* | 10/2016 | Fukasaku | F04C 29/0085 |
| 2017/0012506 | A1* | 1/2017 | Naito | H02K 11/33 |
| 2017/0274735 | A1* | 9/2017 | Kawasaki | H02M 1/14 |
| 2017/0279325 | A1* | 9/2017 | Hamana | H02K 3/28 |
| 2017/0288512 | A1* | 10/2017 | Kagawa | H02K 11/33 |
| 2018/0087511 | A1 | 3/2018 | Fukaya et al. | |
| 2018/0198350 | A1* | 7/2018 | Ambo | H03H 7/0115 |
| 2019/0203715 | A1* | 7/2019 | Heo | H02K 3/522 |
| 2019/0245470 | A1* | 8/2019 | Nigo | F25B 49/025 |
| 2019/0363607 | A1* | 11/2019 | Guntermann | F04B 39/121 |

FOREIGN PATENT DOCUMENTS

| | | | |
|---|---|---|---|
| JP | 2018-53828 A | 4/2018 | |
| WO | WO-2018078843 A1 * | 5/2018 | ............ F25B 49/025 |

\* cited by examiner

ELECTRIC COMPRESSOR

CROSS-REFERENCE TO RELATED APPLICATION

This application claims priority to Japanese Patent Application No. 2020-061979 filed on Mar. 31, 2020, the entire disclosure of which is incorporated herein by reference.

BACKGROUND ART

The present disclosure relates to an electric compressor.

Japanese Patent Application Publication No. 2001-280249 discloses a conventional electric compressor. The electric compressor includes a housing, a drive shaft, an electric motor, and a compression portion. The housing includes a bottom wall that extends in a radial direction of a shaft center of the drive shaft, and a peripheral wall that extends along the shaft center of the drive shaft. The bottom wall and the peripheral wall form a motor chamber in the housing. The housing further includes an inlet port. A pipe is connected to the inlet port through which refrigerant is drawn from an outside of the electric compressor into the housing.

The drive shaft is disposed in the housing including the motor chamber, and rotatable around the shaft center of the drive shaft. The electric motor is disposed in the motor chamber. The electric motor rotates the drive shaft around the shaft center of the drive shaft. Although not disclosed by the Publication No. 2001-280249, the electric motor is connected to an inverter disposed in the housing and hence driving of the electric motor is controlled. The compression portion is disposed in the housing. In the housing, the motor chamber and the inlet port are separated by the compression portion. The compression portion is driven by the drive shaft to compress the refrigerant.

Specifically, the inverter includes a first phase, a second phase, and a third phase through which the inverter is connected to the electric motor. The electric motor includes a stator and a rotor. The stator is fixed in the motor chamber. The drive shaft is fixed in the rotor. The rotor is disposed in the stator and rotatable with the drive shaft around the shaft center of the drive shaft.

The stator includes a stator core, a plurality of first coils, a plurality of second coils, and a plurality of third coils. The stator core is formed in a tubular shape extending along the shaft center of the drive shaft. The stator core includes a plurality of slots. The first through third coils are formed by winding conductor wires in the slots. Each first coil is electrically connected to the first phase. Each second coil is electrically connected to the second phase. Each third coil is electrically connected to the third phase. The first through third coils are connected to each other at the ends of the first through third coils opposite to the first through third phases.

In the electric compressor, each of the first to third coils is energized from the inverter to generate a magnetic field in each of the first to third coils in turn. This rotates the rotor with the drive shaft around the shaft center of the drive shaft in the stator. Thus, the compression portion compresses the refrigerant drawn from the inlet port.

Forming the first through third coils in the stator core includes performing a concentrated winding in which conductor wires are inserted into adjacent slots and performing a distributed winding in which conductor wires are inserted across a plurality of slots.

In recent years, electric compressors for coping with a high voltage of 600 volts or more are required. According to the inventors' verification, however, the first through third coils formed by the distributed winding are located close to each other, so that in a case where the high voltage described above is applied to the first through third coils, partial electric discharge tends to occur due to movement of electrons, which makes it easier for film of the conductor wires be damaged. Thus, reduction of durability of the stator and, eventually, reduction of durability of the electric compressor are concerned. As a measure against the problem, it is considered that the electric motor including the coils formed by the concentrated winding and series winding is provided in the electric compressor.

In some electric compressors, refrigerant caused to pass through the motor chamber to thereby cool the electric motor with the refrigerant. The refrigerant contains lubricant oil. Part of the refrigerant is liquefied in the motor chamber to form liquid refrigerant. Thus, the lubricant oil contained in the refrigerant may be accumulated in the motor chamber with the liquid refrigerant. Therefore, the stator disposed in the motor chamber may cause part of the first through third coils to be immersed in the lubricant oil and the liquid refrigerant.

When the lubricant oil and the refrigerant flows through the pipe, external moisture may pass through the pipe and be inevitably mixed with the lubricant oil and the refrigerant. Thus, the lubricant oil and the liquid refrigerant that are mixed with the moisture are reduced in volume resistivity. Therefore, such first through third coils that are immersed in the lubricant oil and the liquid refrigerant may easily cause electric leakage from the conductor wire to the housing. The reduction of durability of the electric compressor is concerned also in this respect.

The present disclosure is made in view of the above-described circumstances and directed to providing an electric compressor excellent in durability while coping with high voltage.

SUMMARY

In accordance with an aspect of the present disclosure, an electric compressor includes a housing, a drive shaft, an electric motor, a compression portion, and an inverter. The electric motor is configured to rotate the drive shaft. The compression portion is configured to be driven by the drive shaft to compress refrigerant. The inverter includes a first phase, a second phase, and a third phase that are electrically connected to the electric motor to form a three-phase alternating current. The inverter controls driving the electric motor. The housing includes a motor chamber that houses the electric motor and through which refrigerant passes. The electric motor includes a stator that is fixed to the housing and disposed in the motor chamber, and a rotor to which the drive shaft is fixed. The rotor is disposed in the stator and rotatable with the drive shaft. The stator includes: a stator core that has a tubular shape and extends in a direction of a shaft center of the drive shaft; a plurality of first coils formed by winding, to the stator core, a first conductor wire that is electrically connected to the first phase; a plurality of second coils formed by winding, to the stator core, a second conductor wire that is electrically connected to the second phase; and a plurality of third coils formed by winding, to the stator core, a third conductor wire that is electrically connected to the third phase. The first coils are connected to each other in series, the second coils are connected to each other in series, and the third coils are connected to each other in series. One of the first coils that is located electrically closest to the first phase is referred to as a first specific coil, one of the second coils that is located, electrically closest to the second phase is referred to as a second specific coil, and one of the third coils that is located electrically closest to the third phase is referred to as a third specific coil. The first specific coil, the second specific coil, and the third specific coil are disposed above the shaft center of the drive shaft.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe embodiments of the present disclosure with reference to the drawings Specifically, an electric compressor of one embodiment of the present disclosure is a scroll type electric compressor.

Figure 1:
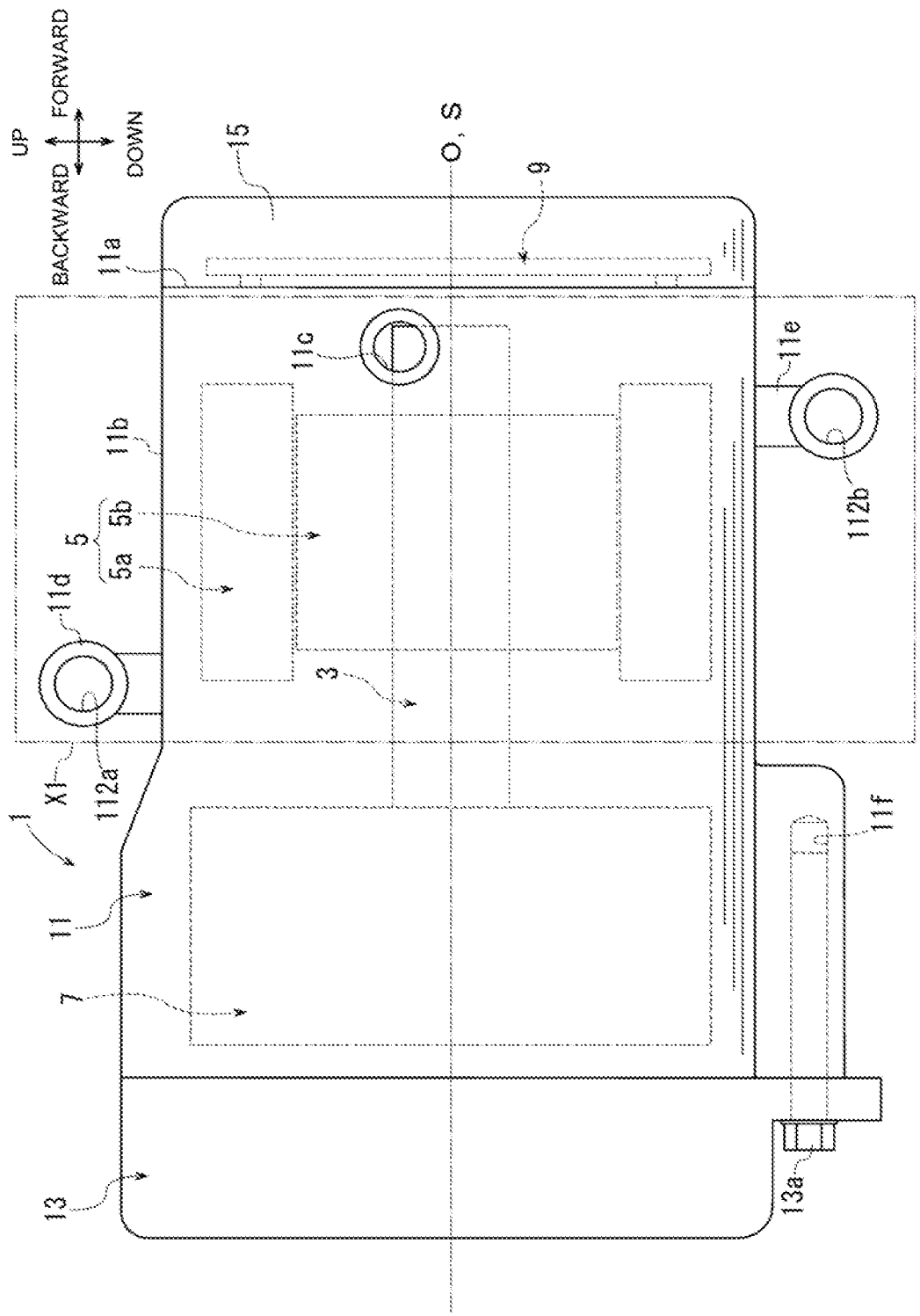
FIG. 1 is a schematic view illustrating an electric compressor according to an embodiment of the present disclosure.

As illustrated in FIG. 1, the electric compressor of the present embodiment includes a housing 1, a drive shaft 3, an electric motor 5, a compression portion 7, and an inverter 9. The housing 1 includes a housing body 11, a rear cover 13, and an inverter cover 15. The electric compressor is mounted in a vehicle (not illustrated) and forms a refrigerant circuit for the vehicle.

Figure 2:
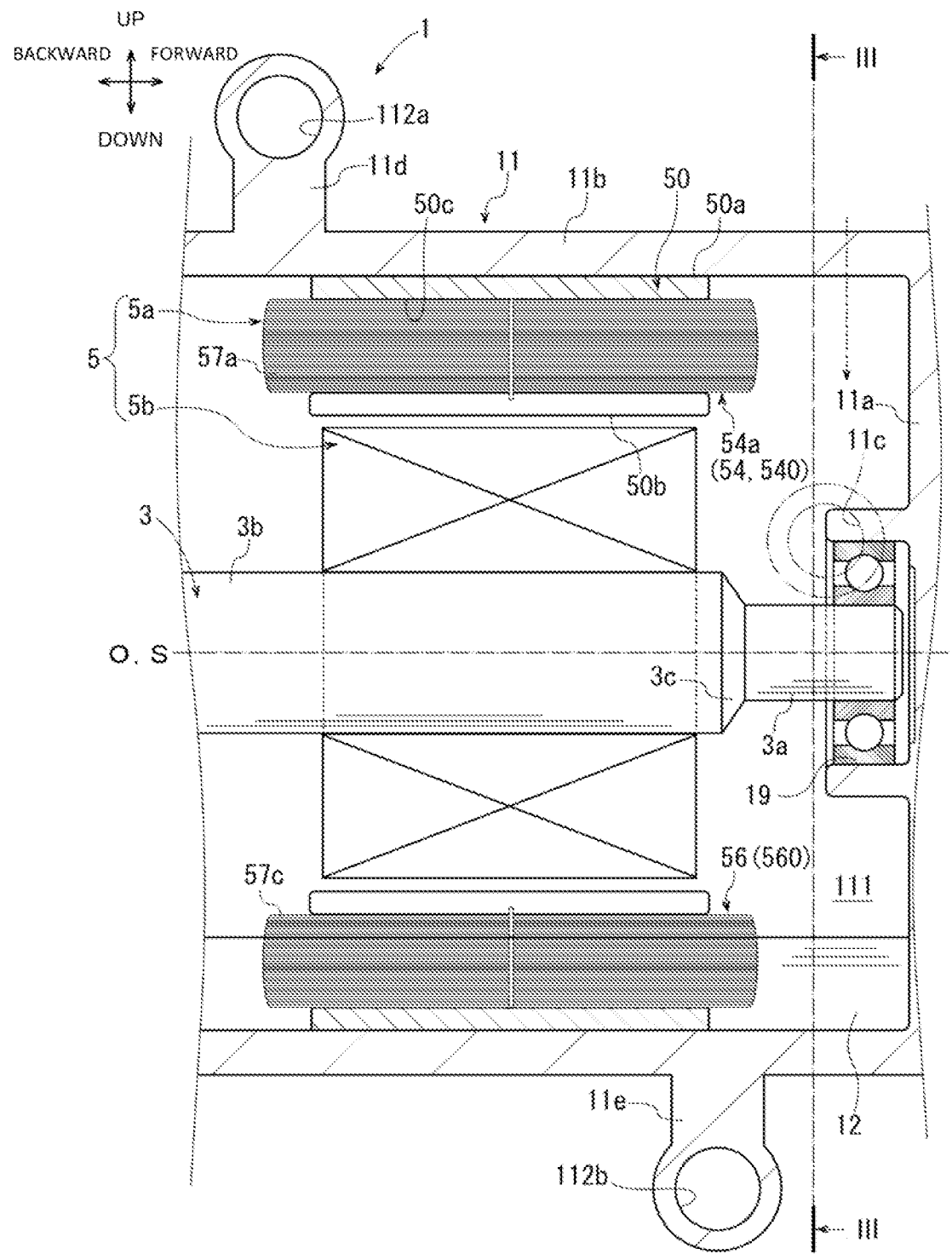
FIG. 2 is a partial enlarged longitudinal sectional view illustrating a part X1 of FIG. 1.

In the present embodiment, a back and forth direction, and an up and down direction of the electric compressor are defined by a solid left-right arrow and a solid up-down arrow illustrated in FIGS. 1 and 2. The up and down direction of the electric compressor is defined by a solid up-down arrow illustrated in FIG. 3 as in FIG. 1, and a right and left direction, or a width direction of the electric compressor is defined by a solid left-right arrow illustrated in FIG. 3. The back and forth direction, the up and down direction, the right and left direction of the electric compressor correspond to a back and forth direction, an up and down direction, a right and left direction of the vehicle, respectively. That is, the electric compressor is mounted in the vehicle in a posture in which a front side of the electric compressor is a front side of the vehicle and a rear side of the electric compressor is a rear side of the vehicle. In addition, the electric compressor is mounted in the vehicle in a posture in which an upper side of a motor chamber 111, which is described later, including an upper side of the electric compressor is an upper side of the vehicle and a lower side of the motor chamber 111 including a lower side of the electric compressor is a lower side of the vehicle. The electric compressor may be mounted in the vehicle in a posture in which the front side of the electric compressor is the rear side of the vehicle. Alternatively, the electric compressor may be mounted in the vehicle in a posture in which the front side of the electric compressor is a right side or a left side of the vehicle.

As illustrated in FIG. 2, the housing body 11 includes a front wall 11a and a peripheral wall 11b. The front wall 11a is located at the front end of the housing body 11 and extends in a radial direction of the housing body 11. The peripheral wall 11b is connected to the front wall 11a and extends backward from the front wall 11a in a direction of a shaft center O of the drive shaft 3. The housing body 11 is formed in a bottomed cylindrical shape extending in the direction of the shaft center O by the front wall 11a and the peripheral wall 11b. The direction of the shaft center O is parallel to the back and forth direction of the electric compressor.

Figure 3:
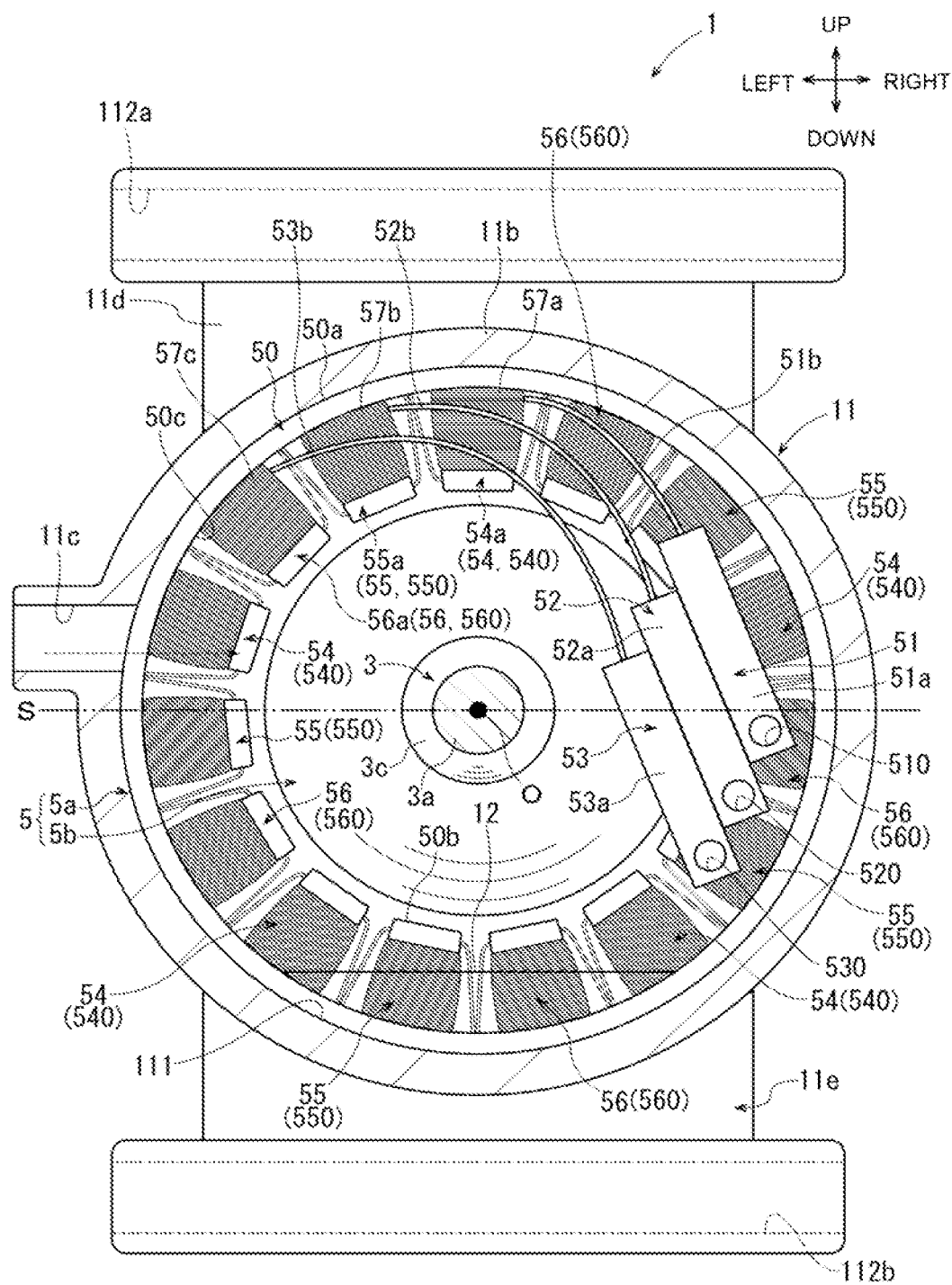
FIG. 3 is a cross sectional view as taken along the line of FIG. 2.

As illustrated in FIGS. 2 and 3, the front wall 11a and the peripheral wall 11b form a motor chamber 111 inside the housing body 11. The motor chamber 111 is separated from the outside of the housing body 11 and, eventually, the outside of the electric compressor by the front wall 11a and the peripheral wall 11b.

In the housing body 11, an imaginary reference surface S is defined. As illustrated in FIG. 3, the reference surface S includes the shaft center O and extends planarly in the motor chamber 111. More specifically, the reference surface S extends horizontally in the motor chamber 111 to form a planar shape while overlapping with the shaft center O.

As illustrated in FIGS. 1 to 3, the peripheral wall 11b includes an inlet port 11c, a first mounting leg 11d, a second mounting leg 11e, and a plurality of bolt holes 11f. The first mounting leg 11d and the second mounting leg 11e are examples of the mounting portion of the present disclosure. It is noted that FIG. 1 illustrates one of the bolt holes 11f.

The inlet port 11c is disposed in the peripheral wall 11b on the upper side of the motor chamber 111 and, eventually, on the upper side of the vehicle. More specifically, the inlet port 11c is located in the peripheral wall 11b on the upper side of the motor chamber 111 with respect to the reference surface S and the shaft center O. As illustrated in FIG. 3, the inlet port 11c extends on the left side of the electric compressor in the radial direction of the housing body 11 and provides communication between the outside of the housing body 11 and the motor chamber 111. The inlet port 11c is connected to an evaporator (not illustrated) through a pipe (not illustrated). Thus, the low-temperature and low-pressure refrigerant gas which has passed through the evaporator is drawn into the motor chamber 111. That is, the motor chamber 111 serves also as a suction chamber. Since the inlet port 11c is located in the peripheral wall 11b on the upper side of the vehicle with respect to the reference surface S and the shaft center O, the refrigerant gas which has passed through the evaporator is drawn into the motor chamber 111 from the upper side of the vehicle with respect to the reference surface S and the shaft center O.

On the other hand, a storage area 12 is provided in the motor chamber 111 on the lower side of the vehicle with respect to the reference surface S. The storage area 12 is configured to store lubricant oil and liquid refrigerant. That is, the inlet port 11c and the storage area 12 are separated from each other across the reference surface S in the up and down direction of the motor chamber 111. Although a ratio of the storage area 12 to the motor chamber 111 varies depending on a storage amount of the lubricant oil and the liquid refrigerant, in the electric compressor, an amount of the lubricant oil, a size of the motor chamber 111, and the like are designed so that the storage area 12 is not formed on the upper side of the vehicle with respect to the reference surface S or the inlet port 11c, in other words, so that liquid level of the lubricant oil and the liquid refrigerant stored in the storage area 12 does not exceed the shaft center O and the inlet port 11c.

The first mounting leg 11d is disposed at a position of the peripheral wall 11b that is on the upper side of the vehicle with respect to the reference surface S and the shaft center O as in the case of the inlet port 11c. That is, the inlet port 11c is located in the peripheral wall 11b closer to the first mounting leg 11d than the reference surface S and the shaft center O. The first mounting leg 11d is disposed at a position of the peripheral wall 11b that is on the upper side of the vehicle with respect to the inlet port 11c. On the other hand, the second mounting leg 11e is disposed at a position of the peripheral wall 11b that is on the lower side of the vehicle with respect to the reference surface S and the shaft center O. That is, the first mounting leg 11d and the second mounting leg 11e are vertically disposed in the peripheral wall 11b across the reference surface S and the shaft center O. The inlet port 11c is located in the peripheral wall 11b at a position between the first mounting leg 11d and the second mounting leg 11e, and on the upper side of the motor chamber 111 with respect to the reference surface S and the shaft center O, that is, on the upper side of the vehicle with respect to the reference surface S and the shaft center O.

As illustrated in FIG. 3, the first mounting leg 11d extends in the right and left direction of the housing body 11 while projecting upward from the peripheral wall 11b in the radial direction of the housing body 11. The second mounting leg 11e extends in the right and left direction of the housing body 11 while projecting downward from the peripheral wall 11b in the radial direction of the housing body 11, The first mounting leg 11d and the second mounting leg 11e have a first mounting hole 112a and a second mounting hole 112b, respectively. The first mounting hole 112a penetrates through the first mounting leg 11d in the right and left direction, and the second mounting hole 112b penetrates through the second mounting leg 11e in the right and left direction. It is noted that the shapes and the number of the first mounting legs 11d and the second mounting legs 11e are suitably designable.

The first mounting leg 11d and the second mounting leg 11e are fastened to an engine, a frame, or the like (not illustrated) of the vehicle using mounting bolts (not illustrated) inserted through the first mounting hole 112a and the second mounting hole 112b, respectively. As a result, the first mounting leg 11d and the second mounting leg 11e attach the housing body 11 and, eventually, the electric compressor to the engine, frame, or the like of the vehicle. At this time, the electric compressor is mounted in the vehicle with its back and forth direction horizontal. Since the second mounting leg 11e is disposed at a position of the peripheral wall 11b that is on the lower side of the vehicle with respect to the reference surface S, the second mounting leg 11e is mounted to the vehicle below the first mounting leg 11d.

The first mounting leg 11d and the second mounting leg 11e attach the electric compressor to the engine, frame, or the like of the vehicle, and thus in the electric compressor the upper side of the motor chamber 111 corresponds to the upper side of the vehicle, and the lower side of the motor chamber 111, including the storage area 12, corresponds to the lower side of the vehicle. That is, the first mounting leg 11d and the second mounting leg 11e define the up and down direction of the motor chamber 111 and, eventually, the up and down direction of the electric compressor mounted in the vehicle. The inlet port 11c is located on the upper side of the vehicle with respect to the reference surface S and the shaft center O, and the storage area 12 is located on the lower side of the vehicle with respect to the reference surface S and the shaft center O as well as the inlet port 11c. The electric compressor is configured not to be able to change its posture independently of the vehicle while being mounted in the vehicle. Therefore, the lubricant oil and liquid refrigerant stored in the storage area 12 are prevented from flowing toward the inlet port 11c and flowing out of the motor chamber 111 through the inlet port 11c.

As illustrated in FIG. 1, each bolt hole 11f extends in the direction of the shaft center O and is opened at the rear end of the housing body 11.

The rear cover 13 is located on the rear side of the housing body 11 in the direction of the shaft center O. The rear cover 13 is fixed to the rear end of the housing body 11 by a plurality of bolts 13a inserted in the respective bolt holes 11f. In FIG. 1, one of the plurality of bolts 13a is illustrated. The rear cover 13 is formed in a bottomed tubular shape, and with a discharge chamber (not illustrated) therein. The discharge chamber is connected to a condenser through a pipe (not illustrated).

The inverter cover 15 is located on the front side of the housing body 11 in the direction of the shaft center O. The inverter cover 15 is fixed to the front wall 11a of the housing body 11 by a plurality of bolts (not illustrated). The inverter cover 15 is formed in a bottomed tubular shape, and accommodates the inverter 9 therein.

Figure 4:
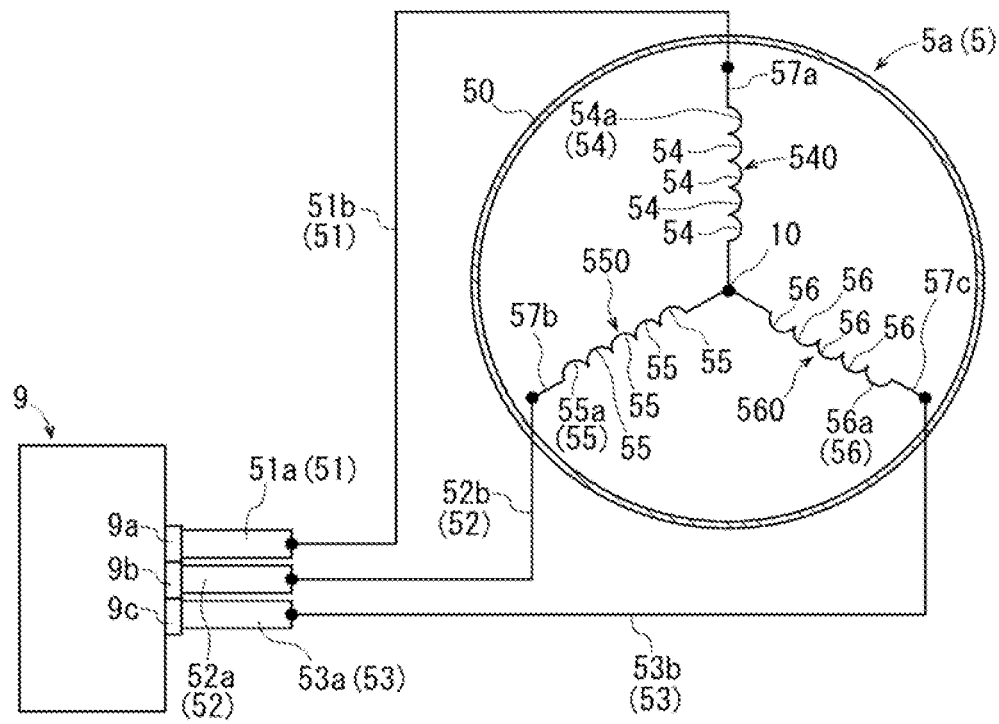
FIG. 4 is a schematic view illustrating connection of a stator and an inverter of the electric compressor.
Figure 5:
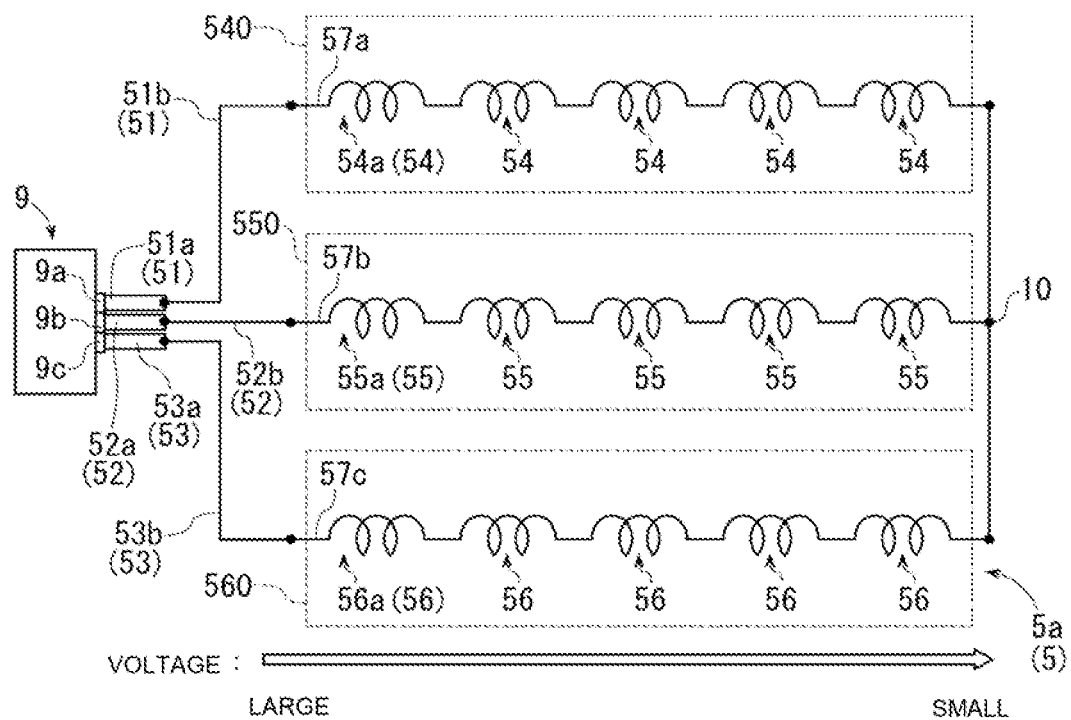
FIG. 5 is a schematic view illustrating a first coil group, a second coil group, and a third coil group of the electric compressor.

As illustrated in FIGS. 4 and 5, the inverter 9 includes a first inverter side connection terminal 9a as a first phase, a second inverter side connection terminal 9b as a second phase, and a third inverter side connection terminal 9c as a third phase. The inverter 9 is electrically connected to the electric motor 5 and, more specifically, a stator 5a to be described later by the first to third inverter side connection terminals 9a to 9c to form a three-phase alternating current. That is, the inverter 9 and the electric motor 5 are connected so as to be energized through the three-phase alternating current. The inverter 9 is electrically connected to a battery (not illustrated) mounted in the vehicle through a power supply connector (not illustrated).

As illustrated in FIGS. 1 and 2, the drive shaft 3 is disposed inside the housing body 11 including the motor chamber 111. As illustrated in FIG. 2, the drive shaft 3 has a shape of a column extending in the direction of the shaft center O, and a small diameter portion 3a, a large diameter portion 3b, and a tapered portion 3c. The small diameter portion 3a is located on the front end side of the drive shaft 3. The large diameter portion 3b is located in the rear of the small diameter portion 3a. The large diameter portion 3b is formed to have a diameter larger than that of the small diameter portion 3a. The tapered portion 3c is located between the small diameter portion 3a and the large diameter portion 3b. The tapered portion 3c is connected at the front end thereof to the small diameter portion 3a. The tapered portion 3c is connected at the rear end thereof to the large diameter portion 3b while increasing its diameter toward the rear.

The drive shaft 3 has the small diameter portion 3a rotatably supported by a radial bearing 19 in the front wall 11a of the housing body 11. Thus, the drive shaft 3 is rotatable around the shaft center O in the motor chamber 111.

The electric motor 5 is housed in the motor chamber 111. The electric motor 5 includes the stator 5a and a rotor 5b. The stator 5a is fixed to the inner circumferential surface of the peripheral wall 11b in the motor chamber 111.

As illustrated in FIGS. 2 and 3, the stator 5a includes a stator core 50, a first connector 51, a second connector 52, a third connector 53, five first coils 54, five second coils 55, and five third coils 56. In order to facilitate the explanation, a part of the first to third coils 54 to 56 is omitted and illustration of the first to third connectors 51 to 53 is omitted in FIG. 2.

As illustrated in FIG. 2, the stator core 50 is formed in the shape of a cylinder extending backward and forward in the direction of the shaft center O and includes an outer circumferential surface 50a and an inner circumferential surface 50b. The stator core 50 is provided with a plurality of slots 50c. Each slot 50c is recessed from the inner circumferential surface 50b toward the outer circumferential surface 50a. As illustrated in FIG. 3 the slots 50c are disposed at equal intervals in the circumferential direction of the stator core 50, and as illustrated in FIG. 2, extend from the front end to the rear end of the stator core 50 in the direction of the shaft center O.

As illustrated in FIG. 3 the first connector 51 includes a first connector housing 51a and a first lead wire 51b. A first connector side connection terminal (not illustrated) is accommodated in the first connector housing 51a. A first connection port 510 is formed in the first connector housing 51a. The first lead wire 51b is connected, at one end thereof, to the first connector side connection terminal in the first connector housing 51a and, at the other end, extends to the outside of the first connector housing 51a. Although detailed illustration is omitted, the first lead wire 51b is inserted in a tube made of resin. The first connector side connection terminal and a connecting portion between the first lead wire 51b and the first connector side connection terminal are sealed by the first connector housing 51a.

The second connector 52 and the third connector 53 have the same structure as the first connector 51. That is, the second connector 52 includes a second connector housing 52a and a second lead wire 52b, and the third connector 53 includes a third connector housing 53a and a third lead wire 53b. A second connection port 520 and a third connection port 530 are formed in the second connector housing 52a and the third connector housing 53a, respectively. The second lead wire 52b and the third lead wire 53b are inserted in respective tubes made of resin.

The first coils 54 are formed by winding respective first conductor wires 57a in the corresponding slots 50c. The second coils 55 are formed by winding respective second conductor wires 57b in the corresponding slots 50c, The third coils 56 are formed by winding respective third conductor wires 57c in the corresponding slots 50c. More specifically, each first coil 54 is formed by a concentrated winding in which the first conductor wire 57a is wound between the adjacent slots 50c plural times. Similarly, each second coil 55 is formed by a concentrated winding in which the second conductor wire 57b is wound between the adjacent slots 50c plural times, and each third coil 56 is formed by a concentrated winding in which the third conductor wire 57c is wound between the adjacent slots 50c plural times. In such a way, the first coils 54, the second coils 55 and the third coils 56 are independent of each other in the stator 5a. The first conductor wire 57a forming each first coil 54, the second conductor wire 57b forming each second coil 55, and the third conductor wire 57c forming each third coil 56 have the same structure and are covered with insulating films (not illustrated). As illustrated in FIG. 2, a part of each of the first to third coils 54 to 56 projecting from the stator core 50 in the direction of the shaft center O is referred to as a coil end.

Since the slots 50c are disposed at equal intervals in the circumferential direction of the stator core 50, the first to third coils 54 to 56 are also disposed at equal intervals in the circumferential direction of the stator core 50 as illustrated in FIG. 3. The first coils 54, the second coils 55, and the third coils 56 are disposed one by one in the circumferential direction of the stator core 50 in the order of the first coil 54, the second coil 55 and the third coil 56. It is noted that the number and the size of the first to third coils 54 to 56 are suitably designable.

As illustrated in FIG. 5, the first coils 54 are connected to each other in series. In the stator 5a, one first coil group 540 is formed by the five first coils 54 connected in series. Similarly, the second coils 55 are connected to each other in series to form one second coil group 550. Similarly, the third coils 56 are connected to each other in series to form one third coil group 560.

On one side of the first coil group 540, the first conductor wire 57a is connected to the first lead wire 51b of the first connector 51. On one side of the second coil group 550, the second conductor wire 57b is connected to the second lead wire 52b of the second connector 52. On one side of the third coil group 560, the third conductor wire 57c is connected to the third lead wire 53b of the third connector 53. On the other sides of the first coil group 540, the second coil group 550 and the third coil group 560, that is, on the sides of the first through third coil groups 540, 550 and 560 opposite to the first through third connectors 51, 52 and 53, the first conductor wire 57a, the second conductor wire 57b and the third conductor wire 57c are connected to each other to form a neutral point 10.

In the first coil group 540, the first coil 54 connected to the first lead wire 51b of the first connector 51, that is, of the five first coils 54 forming the first coil group 540, the first coil 54 directly connected to the first lead wire 51b is referred to as a first specific coil 54a. Similarly, in the second coil group 550, the second coil 55 directly connected to the second lead wire 52b of the second connector 52 is referred to as a second specific coil 55a. In the third coil group 560, the third coil 56 directly connected to the third lead wire 53b of the third connector 53 is referred to as a third specific coil 56a.

That is, in the first coil group 540, the first specific coil 54a is directly connected to the first connector 51 by connecting to the first lead wire 51b, and the other first coils 54 are indirectly connected to the first connector 51 via the first specific coil Ma. Similarly, in the second coil group 550, the second specific coil 55a is directly connected to the second connector 52 by connecting to the second lead wire 52b, and the other second coils 55 are indirectly connected to the second connector 52 via the second specific coil 55a. In the third coil group 560, the third specific coil 56a is directly connected to the third connector 53 by connecting to the third lead wire 53b, and the other third coils 56 are indirectly connected to the third connector 53 via the third specific coil 56a.

As illustrated in FIG. 3, the stator 5a is fixed in the motor chamber 111 by fixing the outer circumferential surface 50a of the stator core 50 to the inner circumferential surface of the peripheral wall 11b. The stator 5a is fixed in the motor chamber 111 in a state where the first to third specific coils 54a to 56a of the first to third coils 54 to 56 are disposed on the upper side of the motor chamber 111 with respect to the inlet port 11c and the shaft center O, that is, on the upper side of the vehicle with respect to the inlet port 11c and the reference surface S. As a result, in the motor chamber 111, the first to third specific coils 54a to 56a are located at positions farther from the storage area 12 than the inlet port 11c and the shaft center O.

On the other hand, some of the first to third coils 54 to 56 other than the first to third specific coils 54a to 56a are disposed in the storage area 12 to be immersed in the lubricant oil and the liquid refrigerant by fixing the stator 5a in the motor chamber 111.

While the stator 5a is fixed, in the motor chamber 111, the first to third connectors 51 to 53 are connected to the first to third inverter side connection terminals 9a to 9c of the inverter 9 via a connection opening (not illustrated) formed through the front wall 11a. Specifically, as illustrated in FIGS. 4 and 5, the first connector 51 is connected to the first inverter side connection terminal 9a, the second connector 52 is connected to the second inverter side connection terminal 9b, and the third connector 53 is connected to the third inverter side connection terminal 9c. In connecting the first connector 51 to the first inverter side connection terminal 9a, the first connector side connection terminal in the first connector housing 51a is connected to the first inverter side connection terminal 9a by the first connection port 510. The same is true of connecting the second and third connectors 52 and 53 to the second and third inverter side connection terminals 9b and 9c, respectively. Thus, the first inverter side connection terminal 9a and the first coil group 540 are connected so as to be energized, and the second inverter side connection terminal 9b and the second coil group 550 are connected so as to be energized. Similarly, the third inverter side connection terminal 9c and the third coil group 560 are connected so as to be energized.

The first conductor wire 57a is electrically connected to the first inverter side connection terminal 9a via the first connector 51, the second conductor wire 57b is electrically connected to the second inverter side connection terminal 9b via the second connector 52, and the third conductor wire 57c is electrically connected to the third inverter side connection terminal 9c via the third connector 53. Thus, in the first coil group 540, the first specific coil 54a is located electrically closest to the first inverter side connection terminal 9a. Similarly, in the second coil group 550, the second specific coil 55a is located electrically closest to the second inverter side connection terminal 9b. Similarly, in the third coil group 560, the third specific coil 56a is located electrically closest to the third inverter side connection terminal 9c.

As illustrated in FIGS. 2 and 3, the rotor 5b is disposed in the stator 5a. The rotor 5b is formed by laminating a plurality of steel plates in the direction of the shaft center O and has a cylindrical shape. The rotor 5b is provided with a permanent magnet (not illustrated). The rotor 5b is fixed with the large diameter portion 3b of the drive shaft 3 by shrink fit. Thus, the rotor 5b is integrally formed with the drive shaft 3 and rotatable with the drive shaft 3 around the shaft center O.

As the compression portion 7 illustrated in FIG. 1, a known scroll type compression portion is adopted. The compression portion 7 includes a fixed scroll that is fixed behind the motor chamber 111 to the inner circumferential surface of the peripheral wall 11b in the housing body 11, and a movable scroll that is disposed so as to face the fixed scroll and rotatable by the drive shaft 3. The fixed scroll and the movable scroll are meshed with each other to form a plurality of compression chambers therebetween. It is noted that the fixed scroll, the movable scroll, and the compression chambers are not illustrated.

In the electric compressor configured as described above, as illustrated by the broken arrows in FIGS. 2 and 3, low-temperature and low-pressure refrigerant gas that has passed through the evaporator is drawn into the motor chamber 111 from the inlet port 11c. At this time, the refrigerant gas is drawn into the motor chamber 111 from the position that is on the upper side of the motor chamber 111 and, eventually, on the upper side of the vehicle with respect to the reference surface S and the shaft center O. The lubricant oil contained in the refrigerant gas is separated from the refrigerant gas in the motor chamber 111. Thus, the refrigerant gas from which the lubricant oil has been separated passes through the motor chamber 111 toward the compression portion 7 while flowing between the stator 5a and the rotor 5b and between the first to third coils 54 to 56. At this time, the electric motor 5 and the like are cooled by the refrigerant gas. On the other hand, the lubricant oil that has been separated from the refrigerant gas flows toward the lower side in the vertical direction in the motor chamber 111 and, eventually, the lower side of the vehicle in the motor chamber 111 by gravity so as to be stored in the storage area 12. In this way, the drive shaft 3, the compression portion 7, and the like are lubricated by the lubricant oil stored in the storage area 12. In addition, part of the refrigerant gas that has been drawn into the motor chamber 111 is liquefied as a liquid refrigerant and stored in the storage area 12 with the lubricant oil.

In the electric compressor, the inverter 9 controls driving the electric motor 5 while supplying power to the stator 5a. Specifically, an alternating current is supplied to each of the first to third coil groups 540 to 560 through the first to third inverter side connection terminals 9a to 9c and the first to third connectors 51 to 53, respectively. That is, an alternating current is supplied to each of the first coils 54 including the first specific coil 54a from the first inverter side connection terminal 9a, and an alternating current is supplied to each of the second coils 55 including the second specific coil 55a from the second inverter side connection terminal 9b. An alternating current is supplied to each of the third coils 56 including the third specific coil 56a from the third inverter side connection terminal 9c. At this time, the phases of the alternating currents supplied from the first to third inverter side connection terminals 9a to 9c are different from each other.

In this way, in the stator 5a, the first to third coil groups 540 to 560 sequentially generate a magnetic field. Therefore, the rotor 5b rotates around the shaft center O together with the drive shaft 3 in the stator core 50. In this way, the electric motor 5 rotates the drive shaft 3 around the shaft center O, so that the compression portion 7 operates. Therefore, the refrigerant gas flowing through the motor chamber 111 toward the compression portion 7 is introduced into the compression portion 7 and compressed in the compression chambers. Then, the compressed refrigerant gas is discharged from the discharge chamber to the condenser via an outlet port.

In the electric compressor, a high voltage of about 800 volts is applied to the stator 5a by supplying power from the inverter 9 to the stator 5a. In this respect, in the electric compressor, the first to third coils 54 to 56 of the stator 5a are formed by concentrated winding, and independent of each other. In this way, in the electric compressor, unlike the case where the first to third coils 54 to 56 are formed by distributed windings, the first to third coils 54 to 56 do not approach each other at the coil end. Thus, even when the above high voltage is applied, partial discharge due to the movement of electrons is less likely to occur in each of the first to third coils 54 to 56. Therefore, in the electric compressor, even if the high voltage is applied, the insulating films of the first to third conductor wires 57*a* to 57*c* are less likely to be damaged in the first to third coils 54 to 56.

Further, in the electric compressor, the first coils 54 are connected in series to form the first coil group 540. Similarly, the second coils 55 are connected in series and the third coils 56 are connected in series to form the second coil group 550 and the third coil group 560, respectively. In the first to third coil groups 540 to 560, the first to third coils 54 to 56 directly connected to the first to third connectors 51 to 53 are the first to third specific coils 54*a* to 56*a*, respectively.

In this way, in the first to third coil groups 540 to 560, the first to third coils 54 to 56 are connected in series, so that in the electric compressor, when the stator 5*a* and, eventually, the first to third coil groups 540 to 560 are energized, in the first coil group 540, the potential gradually decreases from the first connector 51 side and, eventually, the inverter 9 side toward a connection of the first coil group 540 to the second and third coil groups 550 and 560, that is, toward the neutral point 10. Therefore, in the first coil group 540, the voltage applied to the first specific coil 54*a* becomes larger than the voltages applied to the other first coils 54, but the voltages applied to the first coils 54 other than the first specific coil 54*a* become smaller correspondingly. Further, in the first coil group 540, the voltage applied to the first coil 54 also gradually decreases as the distance from the first specific coil 54*a* increases, so that the voltage applied to the first coil 54 closest to the neutral point 10 becomes the smallest. The same is true of the second coil group 550 and the third coil group 560.

Moisture outside the electric compressor is inevitably mixed in the lubricant oil and the refrigerant gas when the lubricant oil and the refrigerant gas circulate in the pipe, the evaporator, and the like. Therefore, the lubricant oil drawn into the motor chamber 111 from the inlet port 11*c* together with the refrigerant gas and, eventually, the lubricant oil and the liquid refrigerant stored in the storage area 12 contain moisture.

In this respect, in the electric compressor, the first specific coil 54*a*, the second specific coil 55*a*, and the third specific coil 56*a* are located on the upper side of the motor chamber 111 with respect to the inlet port 11*c* and the shaft center O in a state where the stator 5*a* is provided in the motor chamber 111. That is, in the motor chamber 111, the first to third specific coils 54*a* to 56*a* are disposed farther from the storage area 12 than the inlet port 11*c* and the shaft center O.

Therefore, in the electric compressor, the first to third specific coils 54*a* to 56*a* are difficult to be immersed in the lubricant oil and the liquid refrigerant in the storage area 12, and the lubricant oil and the liquid refrigerant in the storage area 12 are difficult to adhere to the first to third specific coils 54*a* to 56*a*. As a result, in the electric compressor, it is possible to prevent the first to third specific coils 54*a* to 56*a*, which have a high voltage, from being immersed in the lubricant oil and the liquid refrigerant having a reduced volume resistivity due to contamination of moisture. It is also possible to make the first to third specific coils 54*a* to 56*a* less susceptible to the influence of the lubricant oil and the liquid refrigerant with the reduced volume resistivity. In this way, in the electric compressor, even if the voltages in the first to third specific coils 54*a* to 56*a* are relatively high, it is possible to suppress the electric leakage from the first to third conductor wires 57*a* to 57*c*.

On the other hand, in the electric compressor, in the first to third coil groups 540 to 560, the first to third coils 54 to 56 other than the first to third specific coils 54*a* to 56*a* are disposed closer to the storage area 12 than the first to third specific coils 54*a* to 56*a*. Therefore, part of the first to third coils 54 to 56 other than the first to third specific coils 54*a* to 56*a* is immersed in the lubricant oil and the liquid refrigerant in the storage area 12, that is, the lubricant oil and the liquid refrigerant mixed with moisture. However, as described above, the voltages applied to the first to third coils 54 to 56 other than the first to third specific coils 54*a* to 56*a* are smaller than the voltage applied to the first to third specific coils 54*a* to 56*a*. Therefore, even if the first to third coils 54 to 56 other than the first to third specific coils 54*a* to 56*a* are immersed in the lubricant oil and the liquid refrigerant, it is possible to suppress the electric leakage from the first to third conductor wires 57*a* to 57*c*.

Further, in the electric compressor, the first to third connectors 51 to 53 may be immersed in the lubricant oil and the liquid refrigerant in the storage area 12, but in the first to third connectors 51 to 53, the first to third connector side connection terminals and the connection portions between the first to third connector side connection terminals and the first to third lead wires 51*b* to 53*b* are sealed by the first to third connector housings 51*a* to 53*a*. Therefore, even if the first to third connectors 51 to 53 are immersed in the lubricant oil and the liquid refrigerant in the storage area 12, electric leakage from the first to third connectors 51 to 53 is suppressed.

Therefore, the electric compressor of the embodiment exhibits excellent durability while coping with high voltage.

In particular, in the electric compressor, the first to third connector housings 51*a* to 53*a* seal the first to third connector side connection terminals and the connection portions between the first to third connector side connection terminals and the first to third lead wires 51*b* to 53*b* to thereby suppress the occurrence of electric leakage from the first to third connectors 51 to 53 caused by the lubricant oil and the liquid refrigerant. Therefore, in the electric compressor, as compared with the case where the first to third coils 54 to 56 including the first to third specific coils 54*a* to 56*a* are additionally coated or the like to prevent the occurrence of electric leakage from the first to third coils 54 to 56 caused by the lubricant oil and the liquid refrigerant, it is possible to facilitate manufacture of the stator 5*a*. As a result, the manufacturing cost of the electric compressor is reduced.

In the electric compressor, the amount of lubricant oil, the size of the motor chamber 111, and the like are designed so that the liquid level of the lubricant oil and the liquid refrigerant stored in the storage area 12 does not exceed the inlet port 11*c* and the shaft center O. Further, the electric compressor is configured such that the posture cannot be changed independently of the vehicle in the state of being attached to the vehicle by the first and second mounting legs 11*d* and 11*e*. For these configurations, in the electric compressor, the situation where the liquid level of the lubricant oil and the liquid refrigerant stored in the storage area 12 is located above the inlet port 11*c* in the vertical direction, that is, on the upper side of the motor chamber 111 seldom occurs.

In the electric compressor, the first specific coil 54*a*, the second specific coil 55*a*, and the third specific coil 56*a* are located on the upper side of the motor chamber 111 and, eventually, on the upper side of the vehicle with respect to the inlet port 11*c*. As described above, in the electric compressor, it is preferably avoided that the first to third specific coils 54*a* to 56*a* are immersed in the lubricant oil and the liquid refrigerant, and as a result, the electric leakage from the first to third conductor wires 57*a* to 57*c* is suitably prevented.

In the above, the present disclosure has been described in accordance with the embodiment, but it goes without saying that the present disclosure is not limited to the above embodiment and can be appropriately modified and applied without departing from the spirit of the present disclosure.

For example, the first to third connectors 51 to 53 may be connected to the first to third inverter side connection terminals 9a to 9c of the inverter 9 at positions that are on the upper side of the motor chamber 111 with respect to the inlet port 11c and the shaft center O. In this case, in addition to the first to third specific coils 54a to 56a, the first to third connectors 51 to 53 are also disposed away from the storage area 12, so that it is possible to more preferably prevent the occurrence of electric leakage caused by the lubricant oil and the liquid refrigerant for the first to third connectors 51 to 53.

Further, as the compression portion 7, a vane type compression portion, a swash plate type compression portion, or the like may be adopted.

Further, the inlet port 11c may be formed on the upper side of the motor chamber 111 with respect to the first to third specific coils 54a to 56a. Further, the inlet port 11c may be formed on the lower side of the motor chamber 111 with respect to the reference surface S and the shaft center O.

The present disclosure may be used for air conditioners for vehicles or the like.

An electric compressor of the present disclosure includes a housing, a drive shaft, an electric motor, a compression portion, and an inverter. The electric motor is configured to rotate the drive shaft. The compression portion is configured to be driven by the drive shaft to compress refrigerant. The inverter includes a first phase, a second phase, and a third phase that are electrically connected to the electric motor to form a three-phase alternating current. The inverter controls driving the electric motor. The housing includes a motor chamber that houses the electric motor and through which refrigerant passes. The electric motor includes a stator that is fixed to the housing and disposed in the motor chamber, and a rotor to which the drive shaft is fixed. The rotor is disposed in the stator and rotatable with the drive shaft. The stator includes: a stator core that has a tubular shape and extends in a direction of a shaft center of the drive shaft; a plurality of first coils formed by winding, to the stator core, a first conductor wire that is electrically connected to the first phase; a plurality of second coils formed by winding, to the stator core, a second conductor wire that is electrically connected to the second phase; and a plurality of third coils formed by winding, to the stator core, a third conductor wire that is electrically connected to the third phase. The first coils are connected to each other in series, the second coils are connected to each other in series, and the third coils are connected to each other in series. One of the first coils that is located electrically closest to the first phase is referred to as a first specific coil, one of the second coils that is located electrically closest to the second phase is referred to as a second specific coil, and one of the third coils that is located electrically closest to the third phase is referred to as a third specific coil. The first specific coil, the second specific coil, and the third specific coil are disposed above the shaft center of the drive shaft.

In the electric compressor of the present disclosure, since the refrigerant passes through the motor chamber, it is possible to cool the electric motor with the refrigerant. On the other hand, the lubricant oil contained in the refrigerant and the liquid refrigerant may be stored in the motor chamber. The lubricant oil and the liquid refrigerant are stored on the lower side in a vertical direction in the motor chamber by gravity. Since moisture is inevitably mixed in the lubricant oil and the liquid refrigerant, the volume resistivity is lower than that in the case where moisture is not mixed.

Further, in the electric compressor, the first coils are connected in series. Similarly, the second coils are also connected in series and the third coils are also connected in series. Then, each first coil is electrically connected to the first phase, each second coil is electrically connected to the second phase, and each third coil is electrically connected to the third phase.

If the first coils are connected in parallel and each first coil is energized from the first phase, the voltage in each first coil becomes equal. Therefore, if a high voltage is applied to each of the first coils from the first phase, the high voltage is equally applied to all the first coils. On the other hand, when the first coils are connected in series and each first coil is energized from the first phase, the voltage in the first coil electrically closest to the first phase in the first coils, that is, the voltage in the first specific coil located on the most upstream side in the first coils in the feeding direction from the first phase to each first coil is larger than the voltages in the first coils other than the first specific coil. In other words, the voltages applied to the first coils other than the first specific coil are smaller than that in the first specific coil. According to the inventors' verification, about 70% to 80% of the total voltage applied from the first phase to the first coils is applied to the first specific coil, and the remaining 20% to 30% of the voltage is applied to the first coils other than the first specific coil. Further, as the distances from the first specific coil to the first coils increase, the voltages applied to the first coils also gradually decrease. The same is true of the second coils and the third coils.

In the electric compressor, the first specific coil, the second specific coil, and the third specific coil are disposed above the shaft center in a state where the stator is provided in the motor chamber. That is, the first to third specific coils are located above the shaft center in the vertical direction in the motor chamber. Therefore, in the electric compressor, it is difficult for the first to third specific coils to be immersed in the lubricant oil and the liquid refrigerant stored in the motor chamber. As a result, even if the voltage in the first specific coil is relatively high, electric leakage from the first conductor wire is suppressed. The same is true of the second and third specific coils to suppress electric leakage from the second and third conductor wires, respectively. Although the electric leakage from the first to third conductors, that is, the electric leakage from the first to third specific coils is likely to occur through the moisture separated from the stored lubricant oil and liquid refrigerant, such moisture originally exists outside the electric compressor, and is mixed with the lubricant oil and the liquid refrigerant. Therefore, it is generally difficult to think that a large amount of moisture, in which the amount of the separation exceeds the shaft center in the motor chamber, is mixed with the lubricant oil and the liquid refrigerant. Therefore, if the first to third specific coils are located above the shaft center, the occurrence of the above-mentioned electric leakage is sufficiently suppressed.

In the electric compressor, on the other hand, the first to third coils other than the first to third specific coils may be immersed in the lubricant oil and the liquid refrigerant. However, as described above, the voltages applied to the first to third coils other than the first to third specific coils are smaller than that in the first to third specific coils. Therefore, it is possible to suppress electric leakage from the first to third conductors of the first to third coils that are immersed in the lubricant oil and the liquid refrigerant.

Accordingly, the electric compressor of the present disclosure exhibits excellent durability while coping with high voltage.

The housing may include an inlet port that is located above the shaft center of the drive shaft and provides communication between an outside of the housing and the motor chamber. In addition, it is preferable that the first specific coil, the second specific coil, and the third specific coil are disposed above the inlet port.

In this case, the refrigerant is drawn into the motor chamber through the inlet port. If the lubricant oil and the liquid refrigerant are to be stored beyond the position of the inlet port in the motor chamber, the lubricant oil and the liquid refrigerant will be discharged to the outside of the housing through the inlet port. Therefore, it is difficult that the liquid level of the lubricant oil and the liquid refrigerant stored in the motor chamber exceeds the position of the inlet port. As a result, since the first to third specific coils are located above the inlet port, the first to third specific coils are less likely to be immersed in the lubricant oil and the liquid refrigerant. Therefore, in the electric compressor, it is possible to suitably prevent electric leakage from the first to third conductor wires, so that the durability is further improved.

The electric compressor of the present disclosure may be mounted in a vehicle. In addition, it is preferable that the housing includes a mounting portion that is fixed to the vehicle to define an up and down direction of the motor chamber with the electric compressor mounted in the vehicle. In this case, the mounting portion allows the housing, and thus the electric compressor, to be suitably fixed to the vehicle. Further, since the first to third specific coils are located above the shaft center, the first to third specific coils are less likely to be immersed in the lubricant oil and the liquid refrigerant.

What is claimed is:

1. An electric compressor comprising:
a housing;
a drive shaft;
an electric motor configured to rotate the drive shaft;
a compression portion configured to be driven by the drive shaft to compress refrigerant; and
an inverter including a first phase, a second phase, and a third phase that are electrically connected to the electric motor to form a three-phase alternating current, the inverter controlling driving the electric motor,
wherein the housing includes a motor chamber that houses the electric motor and through which refrigerant passes,
wherein the first phase includes a first inverter-side connection terminal,
wherein the second phase includes a second inverter-side connection terminal,
wherein the third phase includes a third inverter-side connection terminal,
wherein the electric motor includes a stator that is fixed to the housing and disposed in the motor chamber, and a rotor to which the drive shaft is fixed, the rotor being disposed in the stator and rotatable with the drive shaft,
wherein the stator includes:
a stator core that has a tubular shape, a plurality of slots, and extends in a direction of a shaft center of the drive shaft, wherein each slot, among the plurality of slots, is recessed from an inner circumferential surface of the stator core toward an outer circumferential surface of the stator core;
a plurality of first coils formed by winding, to the stator core, a first conductor wire that is electrically connected to the first phase, wherein each first coil, of the plurality of first coils, is formed by a concentrated winding in which the first conductor wire is wound in the slots;
a plurality of second coils formed by winding, to the stator core, a second conductor wire that is electrically connected to the second phase, wherein each second coil, of the plurality of second coils, is formed by a concentrated winding in which the second conductor wire is wound in the slots; and
a plurality of third coils formed by winding, to the stator core, a third conductor wire that is electrically connected to the third phase, wherein each third coil, of the plurality of third coils, is formed by a concentrated winding in which the third conductor wire is wound in the slots;
a first connector, a second connector, and a third connector,
wherein the first coils are connected to each other in series, the second coils are connected to each other in series, and the third coils are connected to each other in series,
wherein one of the first coils that is located electrically closest to the first phase is referred to as a first specific coil, one of the second coils that is located electrically closest to the second phase is referred to as a second specific coil, and one of the third coils that is located electrically closest to the third phase is referred to as a third specific coil,
wherein the first specific coil is connected to the first connector through a first lead wire, the second specific coil is connected to the second connector through a second lead wire, and the third specific coil is connected to the third connector through a third lead wire,
wherein a part of the first connector, a part of the second connector, and a part of the third connector are located below a reference surface in a vertical direction, and a remaining portion, other than the part of the first connector, the part of the second connector, and the part of the third connector, is located above the reference surface in the vertical direction, and
wherein the first specific coil, the second specific coil, and the third specific coil are disposed above the shaft center of the drive shaft.

2. The electric compressor according to claim 1, wherein the housing includes an inlet port that is located above the shaft center of the drive shaft and provides communication between an outside of the housing and the motor chamber, and
wherein the first specific coil, the second specific coil, and the third specific coil are disposed above the inlet port.

3. The electric compressor according to claim 1, wherein the electric compressor is mounted in a vehicle, and
wherein the housing includes a mounting portion that is fixed to the vehicle to define an up and down direction of the motor chamber with the electric compressor mounted in the vehicle.

* * * * *